(12) United States Patent
Graafstra

(10) Patent No.: US 11,108,769 B2
(45) Date of Patent: Aug. 31, 2021

(54) CRYPTOBIONIC SYSTEM AND ASSOCIATED DEVICES AND METHODS

(71) Applicant: VivoKey Technologies Inc., Bellingham, WA (US)

(72) Inventor: Amal Eli Graafstra, Seatle, WA (US)

(73) Assignee: VivoKey Technologies, Inc., Bellingham, WA (US)

( * ) Notice: Subject to any disclaimer, the term of this patent is extended or adjusted under 35 U.S.C. 154(b) by 260 days.

(21) Appl. No.: 16/443,387

(22) Filed: Jun. 17, 2019

(65) Prior Publication Data

US 2019/0386987 A1    Dec. 19, 2019

Related U.S. Application Data

(60) Provisional application No. 62/685,640, filed on Jun. 15, 2018.

(51) Int. Cl.
| | | |
|---|---|---|
| *H04L 29/06* | (2006.01) | |
| *G06F 21/32* | (2013.01) | |
| *H04L 9/32* | (2006.01) | |
| *G06F 21/60* | (2013.01) | |
| *G06Q 20/40* | (2012.01) | |

(52) U.S. Cl.
CPC .......... *H04L 63/0861* (2013.01); *G06F 21/32* (2013.01); *H04L 9/32* (2013.01); *G06F 21/602* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 8,500,031 B2* | 8/2013 | Naelon ................... | G06Q 30/06 235/492 |
| 2003/0014091 A1 | 1/2003 | Rastegar | |
| 2003/0014372 A1* | 1/2003 | Wheeler ............. | H04L 63/0823 705/71 |
| 2004/0005051 A1* | 1/2004 | Wheeler ............... | H04L 9/3247 380/28 |
| 2005/0172282 A1 | 8/2005 | Shenfield | |
| 2008/0233971 A1 | 9/2008 | Panabaker | |

(Continued)

OTHER PUBLICATIONS

Rotter et al. "RFID Implants: Opportunities and and Challenges for Identifying People", Digital Object Identifier 10.1109/MTS.2008. 924862, IEEE Technology and Society Magazine, '08 (Year: 2008).*

(Continued)

*Primary Examiner* — Piotr Poltorak
(74) *Attorney, Agent, or Firm* — Perkins Coie LLP

(57) ABSTRACT

Introduced here are cryptobionic implants designed for implantation within a human body that are capable of facilitating an identity authentication and/or an intent validation process. These cryptobionic implants can be designed to be cryptographically secure. For example, a cryptobionic implant may include a processor configured to encrypt data residing in an internal storage and a transponder configured to transmit the encrypted data to a reader device located outside of the human body for decryption. The reader device (or some other electronic device) may be able to verify the identity of the individual in whom the cryptobionic implant is implanted based on the decrypted data.

9 Claims, 8 Drawing Sheets

(56) References Cited

U.S. PATENT DOCUMENTS

| | | |
|---|---|---|
| 2011/0093047 A1 | 4/2011 | Davis |
| 2011/0154485 A1 | 6/2011 | Hyun |
| 2011/0293095 A1* | 12/2011 | Ben Ayed ............... G06F 21/35 380/270 |
| 2014/0081858 A1* | 3/2014 | Block .................. G07F 19/207 705/43 |
| 2015/0172286 A1 | 6/2015 | Tomlinson |
| 2016/0330573 A1* | 11/2016 | Masoud ................ G06F 21/606 |
| 2017/0068953 A1* | 3/2017 | Kim ..................... G06Q 20/382 |
| 2017/0093846 A1* | 3/2017 | Lopez Lecube ........ G06F 3/017 |
| 2017/0161434 A1 | 6/2017 | Naudi |
| 2017/0259072 A1* | 9/2017 | Newham ............ A61N 1/37254 |
| 2017/0270721 A1 | 9/2017 | Graafstra |
| 2019/0238532 A1* | 8/2019 | Alexander ............ H04L 9/3271 |

OTHER PUBLICATIONS

Malasri et al. "Securing Wireless Implantable Devices for Healthcare: Ideas and Challenges", 0163-6804/09, IEEE Communications Magazine, Jul. 2009 (Year: 2009).*

Burleson et al., "Design Challenges for Secure Implantable Medical Devices", ACM 978-1-4503-1199-1/12/06, DAC 2012, Jun. 3-7, 2012. (Year: 2012).*

International Search Report and Written Opinion dated Oct. 8, 2019 for International Application No. PCT/US2019/037505, 12 pages.

* cited by examiner

600

601
Individual links account for a website with a profile for identity service platform 602
Individual accesses the website on an electronic device 603
Web server reads cookie stored during a previous visit to the website 604
Web server makes call to API of identity service platform 605
Identity service platform sends notification to the electronic device 606
Electronic device instructs the individual to present cryptobionic implant 607
Individual presents the cryptobionic implant to the electronic device 608
Identity service platform issues challenge to the cryptobionic implant 609
Cryptobionic implant processes the challenge 610
Cryptobionic implant generates a response to the challenge 611
Identity service platform cryptographically validates the response 612
Identity service platform provides a response to the call indicating authentication was successful 613
Web server allows the individual to access the website

FIGURE 6

CRYPTOBIONIC SYSTEM AND ASSOCIATED DEVICES AND METHODS

CROSS-REFERENCE TO RELATED APPLICATIONS

This application claims priority to U.S. Provisional Application No. 62/685,640, titled "Cryptobionic System and Associated Methods" and filed on Jun. 15, 2018, which is incorporated by reference herein in its entirety.

TECHNICAL FIELD

Various embodiments concern techniques for authenticating the identity of individuals in whom transponders capable of performing cryptographic operations have been implanted.

BACKGROUND

The concept of identity touches nearly every aspect of life in modern society, especially online activities. Every payment card in a wallet, every key on a keyring, and every credential for an account can be considered a token representative of identity. Each identity token represents the person that possesses it to a source. The source may be, for example, a door, vehicle, website, computer program, or entity such as a merchant or bank. However, given how critical these identity tokens are, they are surprisingly insecure. This is especially true for account credentials (e.g., usernames and passwords) for websites and computer programs accessible via the Internet.

Conventional challenges of identity normally involve a request for account credentials (e.g., by prompting the submittal of a username and password), or possibly a use of cryptographic token or an electronic device to produce an additional identification factor (often called "two-factor authentication"). One problem with these approaches is the lack of security for account credentials, as shown by the long history of massive data breaches and account data compromises. Moreover, additional authentication factors tend to use technologies, such as mobile networks or cryptographic token exchanges, that can be vulnerable to subversion, loss, and theft.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 6 depicts a flow diagram of a process that details how the technology described herein can be used to perform "zero-click" authentication on a website.

Figure 1:
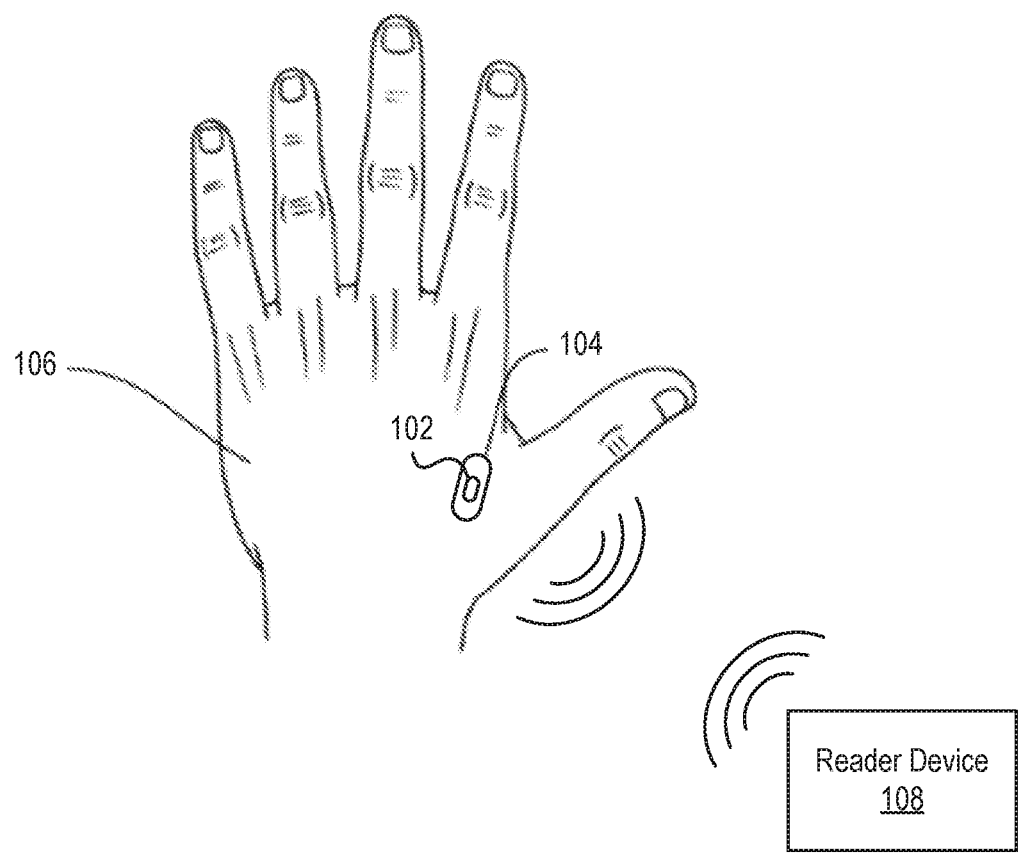
FIG. 1 illustrates how a transponder can be implanted within a human body.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Introduced here are cryptobionic implants designed for implantation within a human body that are capable of facilitating an identity authentication process. The term "cryptobionic," as used herein, refers to the ability to perform cryptographic processes within a living body, such as a human body or animal body. While embodiments may be described in terms of identity authentication processes (also referred to as "identity verification processes"), those skilled in the art will recognize that these implantable transponders may also be used to complete intent validation processes. Generally, an identity authentication process will involve authenticating the identity of an individual (e.g., based on data stored in a cryptobionic implant) and then determining, based on the identity, whether the individual is authorized to access a given resource, complete a given process, etc. Intent validation processes, meanwhile, may be akin to having an individual confirm his/her intent. For example, if an individual wishes to log into his/her account with a financial institution, then the individual may authenticate such action using a cryptobionic implant. If the financial institution deems a transaction as abnormal, then the individual may be prompted to validate the transaction by using the cryptobionic implant.

These cryptobionic implants (also referred to as "cryptobionic devices") are designed to be cryptographically secure. For example, a cryptobionic implant may include a processor configured to encrypt data and a transponder configured to transmit the encrypted data to a reader device located outside of the human body for decryption by an identity service platform. For example, the cryptobionic implant may receive data from the reader device via the transponder, hold the data in a memory at least temporarily, encrypt the data with a cryptographic key, and then transmit the encrypted data to the reader device. The data may be representative of a cryptographic challenge (or simply "challenge") sent to the cryptobionic implant by the reader device, and the encrypted data may be representative of a cryptographic response (or simply "response") send to the reader device by the cryptobionic implant.

In some embodiments, data sent to the cryptobionic implant by the reader device may have been encrypted using a public cryptographic key (or simply "public key") associated with the cryptobionic implant. In such embodiments, the cryptobionic implant can use a private cryptographic key (or simply "private key") stored within its memory to decrypt the data, and then the cryptobionic implant may send the decrypted data to the reader device for authentication/ validation purposes. Alternatively, the decrypted data may contain configuration changes for the cryptobionic implant. The data may also be cryptographically signed by the cryptobionic implant, and the signature may need to be validated before the data is honored. The signature can be checked by first hashing the data and then checking the hash against a hash provided by the signature.

The identity service platform may be able to verify the identity of the individual in whom the cryptobionic implant is implanted based on the data transmitted by the cryptobionic implant to the reader device. The identity service platform may reside on the reader device or some other electronic device that is communicatively connected to the reader device. Accordingly, a cryptobionic implant could be used to secure data, verify identity, and/or authorize transactions without the risk of forgetting or losing the cryptobionic implant.

A cryptobionic implant can work in concert with a computer program that allows the cryptobionic implant to be easily and securely utilized for various activities. In some embodiments, the computer program resides on an electronic device associated with the individual in whom the cryptobionic implant is implanted. For example, the computer program may reside on a mobile phone in the form of a mobile application. In other embodiments, the computer program resides on an electronic device associated with some other individual or entity. For example, the computer program may reside on a card reader associated with a merchant with whom the individual would like to complete a transaction. The computer program may be supported by an identity service platform designed to facilitate interactions between cryptobionic implants and third parties through application programming interfaces (APIs).

As noted above, each cryptobionic implant may include a transponder capable of communicating with electronic devices located in close proximity. The transponder may be a near-field communication (NFC) standards-compliant transponder having an antenna capable of communicating with the communication interface of a reader device that resides outside of the human body. As further described below, to initiate communication, the individual may place the cryptobionic implant near the communication interface of the reader device. Some embodiments of the transponder include an antenna capable of communicating via active radio-frequency identification (RFID). In such embodiments, the cryptobionic implant may include a power source (e.g., a battery) that allows the antenna to periodically or continually transmit data. Other embodiments of the transponder include an antenna capable of communicating via passive RFID. Passive transponders may communicate with a reader device via a magnetic field, a capacitive coupling, or an electromagnetic field. In such embodiments, the antenna may be a tuned inductor coil that is used by the transponder to induct power from the magnetic field and/or modulate the magnetic field to communicate data. A transponder could be designed to communicate only with the identity service platform (also referred to as an "identity clearinghouse") to authenticate an individual, authorize transactions, and/or verify the identity of the individual— either online or in person.

Embodiments may be described with reference to particular computer programs, communication protocols, networks, etc. However, those skilled in the art will recognize that the features of these embodiments are equally applicable to other computer program types, communication protocol types, network types, etc. Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program an electronic device to receive input indicative of a request from a third-party service to submit a cryptographic challenge to a cryptobionic implant, transmit a cryptographic challenge to the transponder of the cryptobionic implant over a short-range communication protocol, receive a response to the cryptographic challenge from the cryptobionic implant, and then return the response (or data representative of the response) to the third-party service.

Terminology

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

The terms "connected," "coupled," or any variant thereof is intended to include any connection/coupling between two or more elements, either direct or indirect. The connection/ coupling can be physical, logical, or a combination thereof. For example, components may be electrically or communicatively coupled to one another despite not sharing a physical connection.

The term "based on" is to be construed in an inclusive sense rather than an exclusive or exhaustive sense. Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

FIG. 1 illustrates how a transponder 102 can be implanted within a human body. Here, the transponder 102 is part of an implant 104 with cryptographic processing capabilities that has been implanted into the left hand 106 of the human body. In particular, the cryptobionic implant 104 (also referred to as a "cryptobionic implant") has been sub-dermally implanted into the fascia tissue between the dermis and muscle in the left hand 106.

The cryptobionic implant 104 could be implanted in other parts of the human body, however. The location of the cryptobionic implant 104 is generally not important, through placement between the first and second metacarpal bones of either hand offers several advantages. In this location, the cryptobionic implant 104 can be easily placed near a reader device 108 that is secured in a particular location. The reader device 108 is an electronic device capable of communicating with the transponder 102 of the cryptobionic implant 104. One example of a reader device is a card reader that can be used by a merchant to scan payment cards (e.g., credit cards and debit cards). Another example of a reader device is an access control terminal that limits access to a physical environment (e.g., by controlling the lock of a door). Other examples of reader devices include mobile phones, wearable electronic devices (e.g., watches and fitness trackers), laptop computers, etc. If the reader device 108 is a mobile phone or wearable electronic device, then the location of the cryptobionic implant 104 is less critical as the reader device 108 can be easily placed near the cryptobionic implant 104.

The transponder 102 may be a radio-frequency identification (RFID) transponder capable of communicating with the reader device 108 using electromagnetic fields. As further described below, the reader device 108 can be configured to automatically identify the cryptobionic implant 104 (and thus the individual in whom the cryptobionic implant 104 is implanted) based on a response emitted by the transponder 102 in response to a challenge emitted by the reader device 108. This exchange of data may be performed in accordance with a short-range communication protocol, such as Bluetooth®, near-field communication (NFC), Zigbee®, or a proprietary point-to-point communication protocol. Accordingly, the transponder 102 may be a cryptographically-secure, NFC-compliant transponder that can be used for identification, authentication, etc.

Figure 2:
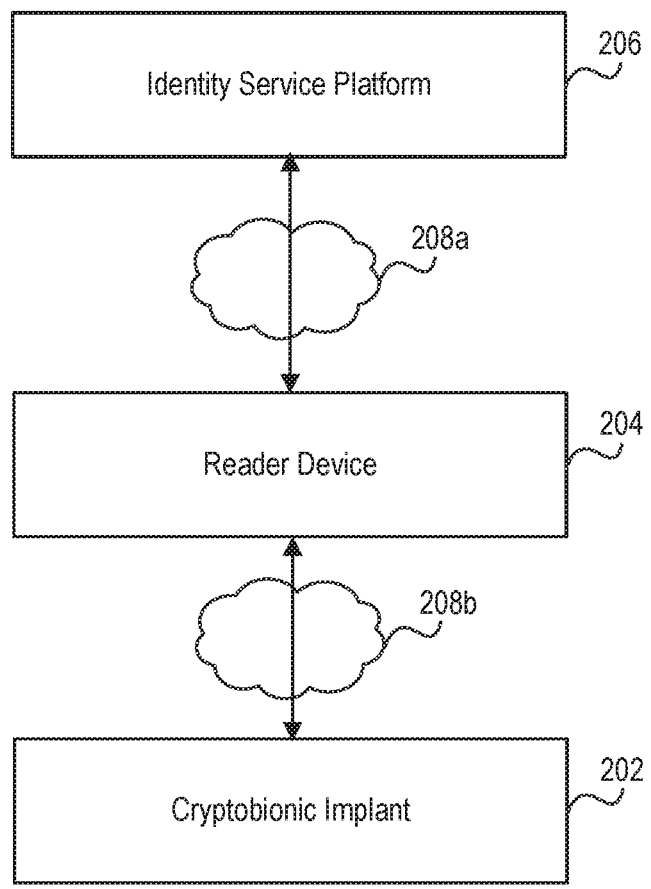
FIG. 2 illustrates a network environment that includes a cryptobionic implant capable of communicating with a reader device that is communicatively coupled to an identity service platform.

FIG. 2 illustrates a network environment 200 that includes a cryptobionic implant 202 capable of communicating with a reader device 204 that is communicatively coupled to an identity service platform 206. The identity service platform 206 may be responsible for validating the identify of a person in whom the cryptobionic implant 202 is implanted based on signals emitted by the cryptobionic implant 202 that are detected by the reader device 204. The identity service platform 206 may also be responsible for creating interfaces through which individuals can connect third-party services/systems to the identity service platform 206, manage preferences, etc.

The identity service platform 206 may be designed such that an individual can communicatively couple a third-party service/system to the identity service platform 206 through an application programming interface (API). For example, the identity service platform 206 may support APIs associated with OAuth 2.0, OpenID Connect, SAML 2.0 Authentication single sign-on (SSO), and Shibboleth, as well as proprietary APIs The individual may be associated with the third party or the identity service platform 206. Through the API, the third-party service/system can seamlessly communicate with the identity service platform 206.

Imagine, for example, that an individual is interested in completing a transaction with a merchant at a physical storefront. The individual may attempt to complete the transaction by presenting a payment card (e.g., a credit card or debit card) to a payment processing system of the merchant. Thereafter, the payment processing system may send information regarding the transaction to a financial institution for review. A payment authorization system associated with the financial institution may be communicatively coupled to the identity service platform 206 through a dedicated API accessible only to the payment authorization system. As part of the transaction, the purchaser may be prompted to scan his/her cryptobionic implant at a reader device (e.g., a card reader managed by the merchant, or a mobile phone associated with the purchaser). The reader device 204 can transmit cryptographically-secure data indicative of the cryptobionic implant 202 to the identity service platform 206, and then the identity service platform 206 can transmit an indication of authentication to the payment authorization system of the financial institution via the API. The payment authorization system can determine whether to approve payment for the transaction based on the indication of authentication received from the identity service platform 206.

As another example, an individual may be interested in completing a transaction with a merchant through a digital storefront. The individual may attempt to complete the transaction by entering details regarding a payment card into a website for transmittal to a payment processing system of the merchant. Thereafter, the payment processing system may send information regarding the transaction to a financial institution for review. A payment authorization system associated with the financial institution may be communicatively coupled to the identity service platform 206 through a dedicated API accessible only to the payment authorization system. As part of the transaction, the purchaser may be prompted to scan his/her cryptobionic implant using a mobile phone on which the identity service platform 206 resides in the form of a mobile application. The identity service platform 206 can transmit an indication of authentication to the payment authorization system of the financial institution via the API. The payment authorization system can determine whether to approve payment for the transaction based on the indication of authentication received from the identity service platform 206.

As noted above, the cryptobionic implant 202, reader device 204, and identity service platform 206 (collectively referred to as the "networked components") may reside in a network environment 200. Thus, the networked components may be connected to one or more networks 208a-b. The network(s) 208a-b can include personal area networks (PANs), local area networks (LANs), wide area networks (WANs), metropolitan area networks (MANs), cellular networks, the Internet, etc. Additionally or alternatively, the networked components can be communicatively coupled to one another over a short-range communication protocol, such as Bluetooth®, NFC, Zigbee®, or a proprietary point-to-point communication protocol. For example, the cryptobionic implant 202 and the reader device 204 may communicate with one another via NFC, while the reader device 204 and the identity service platform 206 may be communicate with one another via the Internet.

Interfaces created and/or supported by the identity service platform 206 may be accessible via a web browser, desktop application, mobile application, or over-the-top (OTT) application. Accordingly, the interfaces may be viewed on a laptop computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Some embodiments of the identity service platform 206 can be hosted locally. That is, the identity service platform 206 may reside on the reader device 204. For example, the identity service platform 206 may be embodied as a mobile application executing on a mobile phone that serves as the reader device 204. As another example, the identity service platform 206 may be embodied as a software plug-in that resides on a card reader or an access control terminal that serves as the reader device 204. Other embodiments of the identity service platform 206 are executed by a cloud computing service operated by Amazon Web Services® (AWS), Google Cloud Platform™, Microsoft Azure®, or a similar technology. In such embodiments, the identity service platform 206 may reside on a computer server that is accessible to the reader device 204 across a network 208a.

Figure 3:
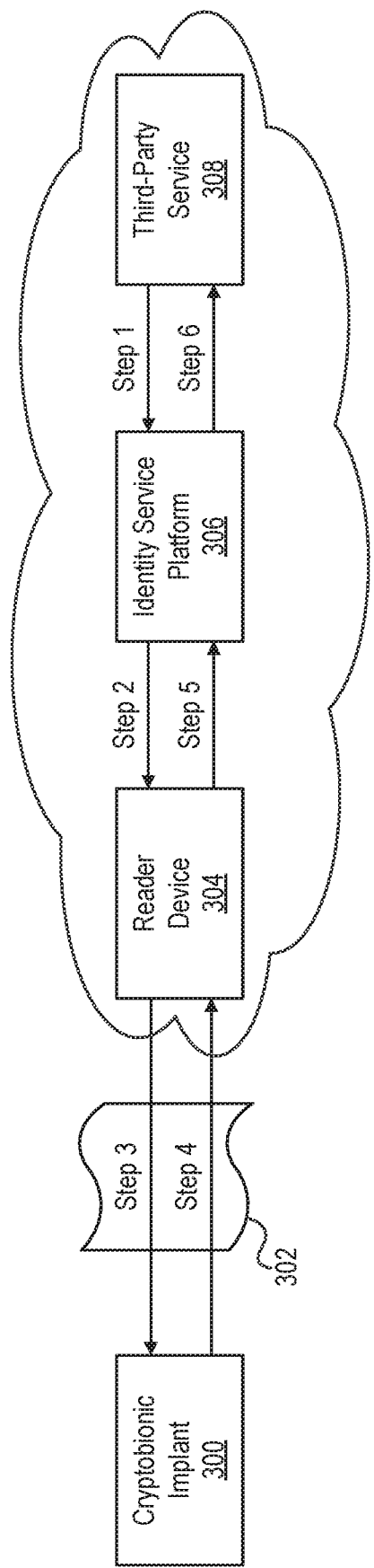
FIG. 3 depicts a flow diagram of a process for authenticating the identity of an individual in whom a cryptobionic implant has been implanted.

FIG. 3 depicts a flow diagram of a process for authenticating the identity of an individual in whom a cryptobionic implant 300 has been implanted. In particular, FIG. 3 illustrates how a third-party service can communicate with an identity service platform responsible for verifying the identity of the individual. While the process of FIG. 3 is described in terms of a third-party service for the purpose of illustration, those skilled in the art will recognize that the technology is equally applicable to third-party systems. Examples of third-party systems include database systems, payment processing systems, permission verification systems, etc.

Initially, a service associated with a third party can submit a request for identity authentication and/or intent validation over a network such as the Internet (step 1). For example, the third-party service 308 may submit a request to an identity service platform 306 via an API. In some embodiments, the API is a dedicated API accessible only to the third-party service 308. In such embodiments, the identity service platform 306 may be accessible via multiple APIs, and each API of the multiple APIs may be associated with a different third-party service. The request may include information associated with the third-party service 308, the individual in whom the cryptobionic implant 300 is implanted, the nature of the service being rendered, etc. The terms "third-party service" and "external service" refer to a service associated with an individual/entity other than the individual in whom the cryptobionic implant 300 is implanted and the entity responsible for managing the identity service platform 306.

The identity service platform 306 can then forward the request (or data indicative of the request) to a reader device 304 (step 2). For example, upon receiving the request from the third-party service 308, the identity service platform 306 may store information regarding the request in a memory and then generate a notification to be transmitted to the reader device 304. Upon receiving the notification, the reader device 304 may prompt the individual to validate the request by placing the cryptobionic implant 300 near a communication interface 302. The communication interface 302 may be attached to, or embedded within, the reader device 304. One example of a communication interface 302 is an NFC radio interface.

When the cryptobionic implant 300 is placed near the communication interface 302 of the reader device 304, the reader device 304 can interrogate the cryptobionic implant 300. For example, the reader device 304 may transmit inquiry data in the form of interrogating radio waves to the cryptobionic implant 300 (step 3), and then the cryptobionic implant 300 may respond by transmitting identity data in the form of responding radio waves to the reader device 304 (step 4). The reader device 304 can then send at least a portion of the identity data to the identity service platform 306 for authentication (step 5).

In some instances, the cryptobionic implant 300 may not hold any identity data. In such embodiments, the cryptobionic implant 300 may simply need to be cryptographically proven to be authentic, and all identity data could be hosted on the identity service platform 306 (e.g., in profiles associated with different cryptobionic implants, individuals, etc.). For example, data may be sent to the cryptobionic implant 300 by the reader device 304 may have been encrypted using a public key. The data may have been encrypted by the identity service platform 306 using a public key stored in a profile associated with the cryptobionic implant 300 or individual. The profile could be associated with one or more cryptobionic implants implanted within the corresponding individual. The cryptobionic implant 300 can use a private key stored within its memory to decrypt the data, and then the cryptobionic implant 300 may send the decrypted data to the reader device 304 for authentication/validation purposes. The data may also be cryptographically signed by the cryptobionic implant 300 and/or identity service platform 306, and the signature may need to be validated before the data is honored. The signature can be checked by first hashing the data and then checking the hash against a hash provided by the signature.

At this point, the identity service platform 306 and cryptobionic implant 300 may begin communicating with each other through the reader device 304 using secure cryptograms until the cryptobionic implant 300 is able to cryptographically prove that it is legitimate. Said another way, the identity service platform 306 and cryptobionic implant 300 may cryptographically communicate with one another until the identity service platform 306 can establish that the cryptobionic implant 300 is legitimate (i.e., is not an unauthorized entity attempting to emulate/mimic the cryptobionic implant 300).

After the identity service platform 306 has established that the cryptobionic implant 300 is legitimate, the identity service platform 306 can consider the request for identity authentication and/or intent validation as having been approved. The identity service platform 306 can then transmit a message representative of an approval of the request for identity authentication and/or intent validation to the third-party service 308 (step 6). Alternatively, if the individuals fails to scan the cryptobionic implant 300 properly or opts not to scan the cryptobionic implant 300, then the identity service platform 306 can transmit an error message to the third-party service 308. In such embodiments, the third-party service 308 may choose not to perform any further actions on behalf of the individual. For example, as further described below, the third-party service 308 may opt to restrict access to a website, disapprove a payment transaction, etc.

Figure 4:
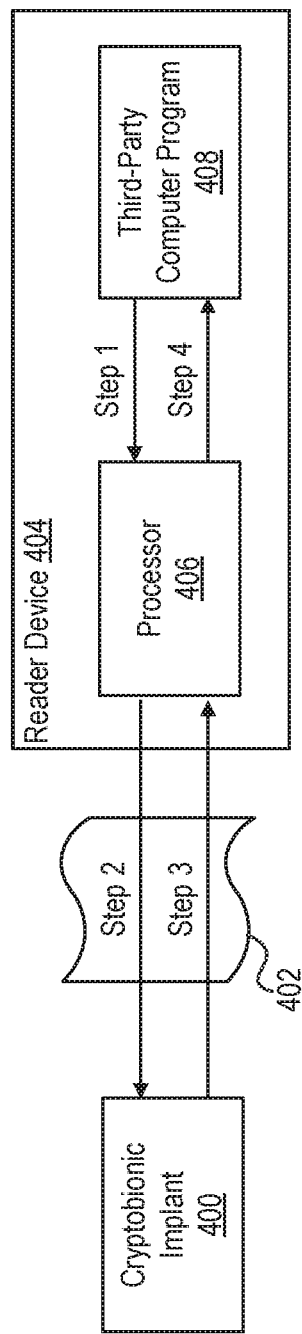
FIG. 4 depicts a flow diagram of another process for authenticating the identity of an individual in whom a cryptobionic implant has been implanted.

FIG. 4 depicts a flow diagram of another process for authenticating the identity of an individual in whom a cryptobionic implant 400 has been implanted. Here, however, the request for identity authentication is submitted by a third-party computer program 408 executing on the reader device 404. The third-party computer program may be a desktop application, mobile application, or OTT application.

Initially, the third-party computer program 408 may instruct the reader device 404 to interrogate the cryptobionic implant 400 (step 1). For example, the third-party computer program 408 may submit a request for one or more cryptographic public keys hosted on the cryptobionic implant 400 to a processor 406 of the reader device 404. The processor 406 can then forward the request (or data indicative of the request) to the cryptobionic implant 400 via a communication interface 402 (step 2). The communication interface 402 may be attached to, or embedded within, the reader device 404. One example of a communication interface 402 is an NFC radio interface.

Upon receiving the request, the cryptobionic implant 400 can generate a response that includes the cryptographic public key(s), and then the cryptobionic implant 400 can transmit the response to the processor 406 of the reader device 404 using the communication interface 402 (step 3). In some embodiments, the processor 406 stores the cryptographic public key(s) in a database structure maintained within a storage accessible to the reader device 404. The processor 406 can maintain a list of authorized cryptobionic implants by updating the log as cryptographic public keys are received by cryptobionic implants over time. As shown in FIG. 4, the processor 406 can then provide the cryptographic public key(s) to the third-party computer program 408 (step 4). Alternatively, the processor 406 may send a notification to the third-party computer program 408 that indicates the cryptographic public key(s) were retrieved as requested. Receipt of the notification or the cryptographic public key(s) may be sufficient for the third-party computer program 408 to consider the identity of the individual in whom the cryptobionic implant 400 has been implanted as verified.

Imagine, for example, that an individual wishes to enroll a cryptobionic implant with a lock (e.g., for a door) to enable access control. The lock (or access control system that is communicatively connected to the lock) needs to know the public key associated with the cryptobionic implant so that it can generate an appropriate challenge. In an enrollment scenario, the lock wants to get the public key from the cryptobionic implant, so the lock may be set in a "learning mode" such that the public key can be learned upon scanning of the cryptobionic implant. When the individual scans the cryptobionic implant, the lock will ask the cryptobionic implant for its public key, and the cryptobionic implant will provide the public key in a format that is signed (e.g., the public key itself may be hashed, and the hash may be signed using the private key corresponding to the public key). Upon receiving the public key, the lock can check the signature to ensure the sender has possession of the corresponding private key.

Thereafter, when the individual approaches the lock and presents the cryptobionic implant, the lock will get the public key from the cryptobionic implant, compare the public key to a list (e.g., hosted on the lock or the identity service platform), and then determine whether the individual should be allowed entry based the comparison. In particular, the lock may send a challenge to the cryptobionic implant, and the cryptobionic implant may sign the challenge with the private key and send the signed challenge back as the response. The lock can check whether the signature is valid using the public key received during the enrollment process. If the signature is determined to be valid, the lock can permit access.

Figure 5:
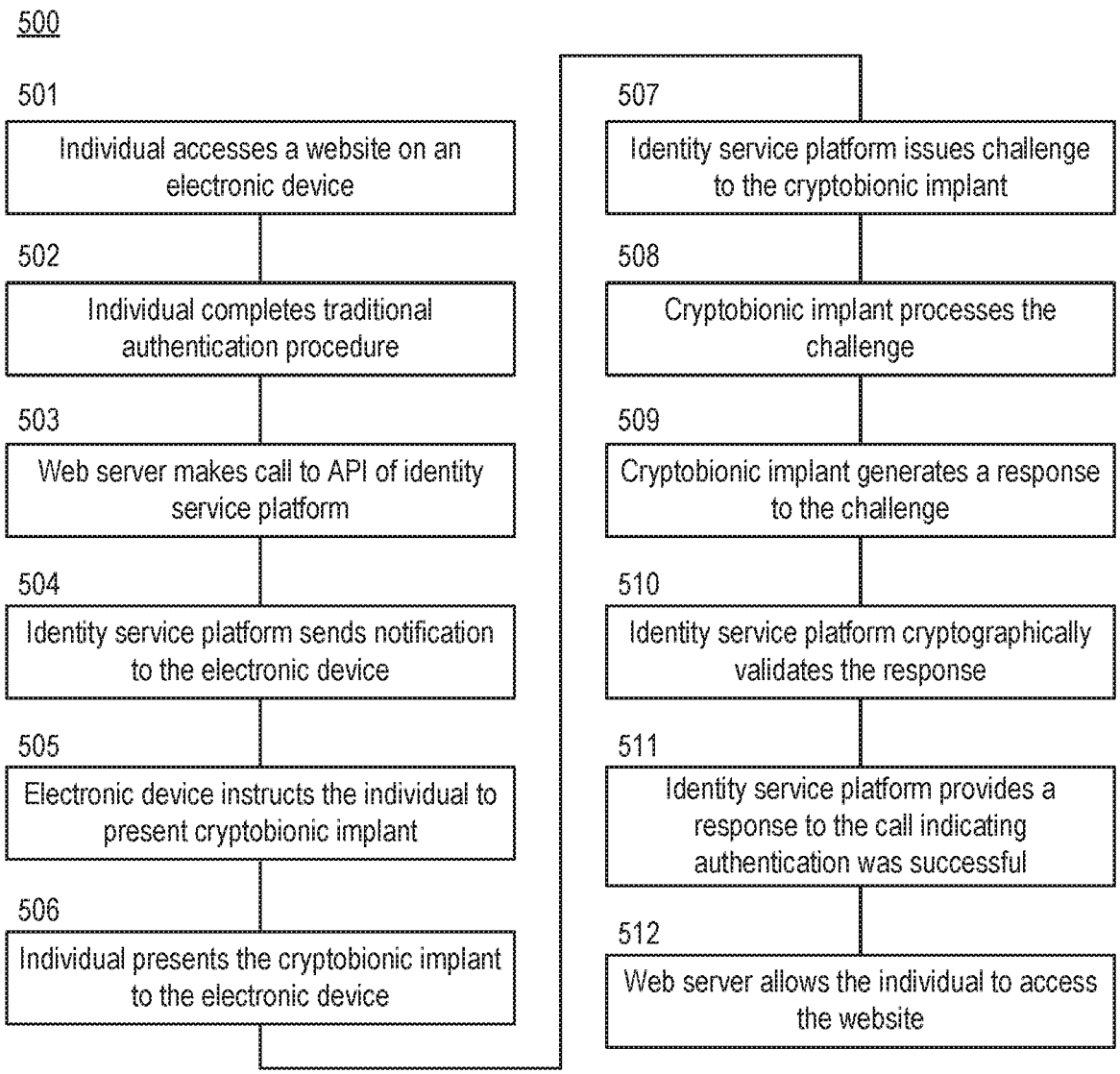
FIG. 5 depicts a flow diagram of a process that details how the technology described herein can be used as a replacement for passwords or two-factor authentication.

FIG. 5 depicts a flow diagram of a process 500 that details how the technology described herein can be used as a replacement for passwords or as part of a two-factor authentication procedure. Here, the process 500 is described in the context of validating identity upon logging into a website. However, those skilled in the art will recognize that the technology is equally applicable in other scenarios.

Initially, an individual may access a website using a web browser that is executing on an electronic device (step 501). The electronic device may be, for example, a laptop computer, mobile phone, head-mounted display, or wearable electronic device such as a watch or fitness accessory. The individual may authenticate himself/herself using at least a portion of a set of credentials associated with an account for the website (step 502). In some embodiments, the individual may input a username and password. In other embodiments, the individual may only input a username. In such embodiments, the individual may rely on the cryptobionic implant to act as the "password" for the account.

After the credentials have been submitted, the computer server (also referred to as a "web server") responsible for supporting the website can determine whether the account is associated with a profile for an identity service platform. The computer server may determine whether the account has been linked with the profile through, for example, standard means such as OAuth 2.0, Open ID Connect, a proprietary authorization protocol, SAML 2.0 Authentication single sign-on (SSO), Shibboleth, etc. OAuth 2.0 is a standard authorization protocol, while Open ID Connect is an identity layer on top of OAuth 2.0 that allows a client (e.g., the computer server) to access and verify the identity data of a user (e.g., the individual) based on authentication performed by a separate authorization computer server. The identity data could include details such as name, physical address, email address, etc. In response to determining that the account has been linked with the profile, the computer server can make a call to an API of the identity service platform (step 503). The call may be representative of an authentication request in which the computer server provides a token that identifies the linked profile. In some embodiments the token is generated by the computer server based on a format specified by the identity service platform, while in other embodiments the token is a token that was previously received from the identity service platform. The token may be in a predetermined format that has been agreed upon by the computer server and identity service platform.

The identity service platform can then send a notification to the electronic device with information regarding the authentication request (step 504). For example, the notification may specify the name of the website, the username of the account requiring authentication, etc. Upon receiving the notification from the identity service platform, the electronic device may instruct the individual to present his/her cryptobionic implant to the communication interface to validate the authentication request (step 505). As noted above, the communication interface may be affixed to, or embedded within, the electronic device. Thereafter, the individual can present the cryptobionic implant to the communication interface of the electronic device (step 506).

Completion of such action may permit the identity service platform to communicate with the cryptobionic implant. In some embodiments, the identity service platform communicates directly with the cryptobionic implant (e.g., via the Internet). In other embodiments, the identity service platform communicates indirectly with the cryptobionic implant (e.g., via the electronic device). As part of the authentication process, the identity service platform may present a question (also referred to as a "challenge") to which the cryptobionic implant must provide a valid answer (also referred to as a "response") in order to be authenticated (step 507). Accordingly, the identity service platform may issue a challenge that requires the cryptobionic implant employ cryptographic processing while in the human body.

After processing the challenge (step 508), the cryptobionic implant can generate a response (step 509). To generate the response, the cryptobionic implant may encrypt data (e.g., cryptographic public keys) stored within storage of the cryptobionic implant. The cryptobionic implant can transmit the response to the communication interface of the electronic device, which forwards the response to the identity service platform where it is cryptographically validated (step 510). For example, the identity service platform may decrypt the response using a cryptographic key associated with the cryptobionic implant, the individual, the computer server, the third-party service associated with the computer server, or any combination thereof. After the identity service platform has confirmed the response is legitimate, the identity service platform can provide a response to the call placed by the computer service through the API (step 511). For example, the identity service platform may send a response to the computer server that indicates the authentication was successful. Upon receiving the response from the identity service platform, the computer server can deem the individual authenticated and allow the individual to access the website (step 512).

FIG. 6 depicts a flow diagram of a process 600 that details how the technology described herein can be used to perform "zero-click" authentication on a website. The website may be associated with a financial institution (e.g., a bank or investment firm), insurance provider, accounting firm, law firm, government agency (e.g., the Internal Revenue Service or a department of motor vehicles), or some other entity that handles sensitive information. Initially, the individual links his/her account for a website with a profile for an identity service platform (step 601). The individual may link the account and profile through, for example, standard means such as OAuth 2.0, OpenID Connect, or a proprietary authorization protocol.

Thereafter, when the individual accesses the website using a web browser that is executing on an electronic device (step 602), the computer server (also referred to as a "web server") responsible for supporting the website can read a Hypertext Transfer Protocol (HTTP) cookie (also referred to as a "web cookie," "Internet cookie," "browser cookie," or simply "cookie") storing during a previous visit to the website (step 603). The cookie may include (or refer to) a token that was previously acquired upon completing an authorization procedure or an account-linking procedure. One example of an authorization procedure is process 500 of FIG. 5. The computer server can then make a call to an API of the identity service platform (step 604). The call may be representative of an authentication request in which the computer server provides the token that identifies the linked profile.

Steps 604-613 of FIG. 6 may be similar to steps 503-512 of FIG. 5. Accordingly, once the authentication process has been successfully completed by the identity service platform, the web server may permit the individual to access the website without manually entering any credentials.

Figure 7:
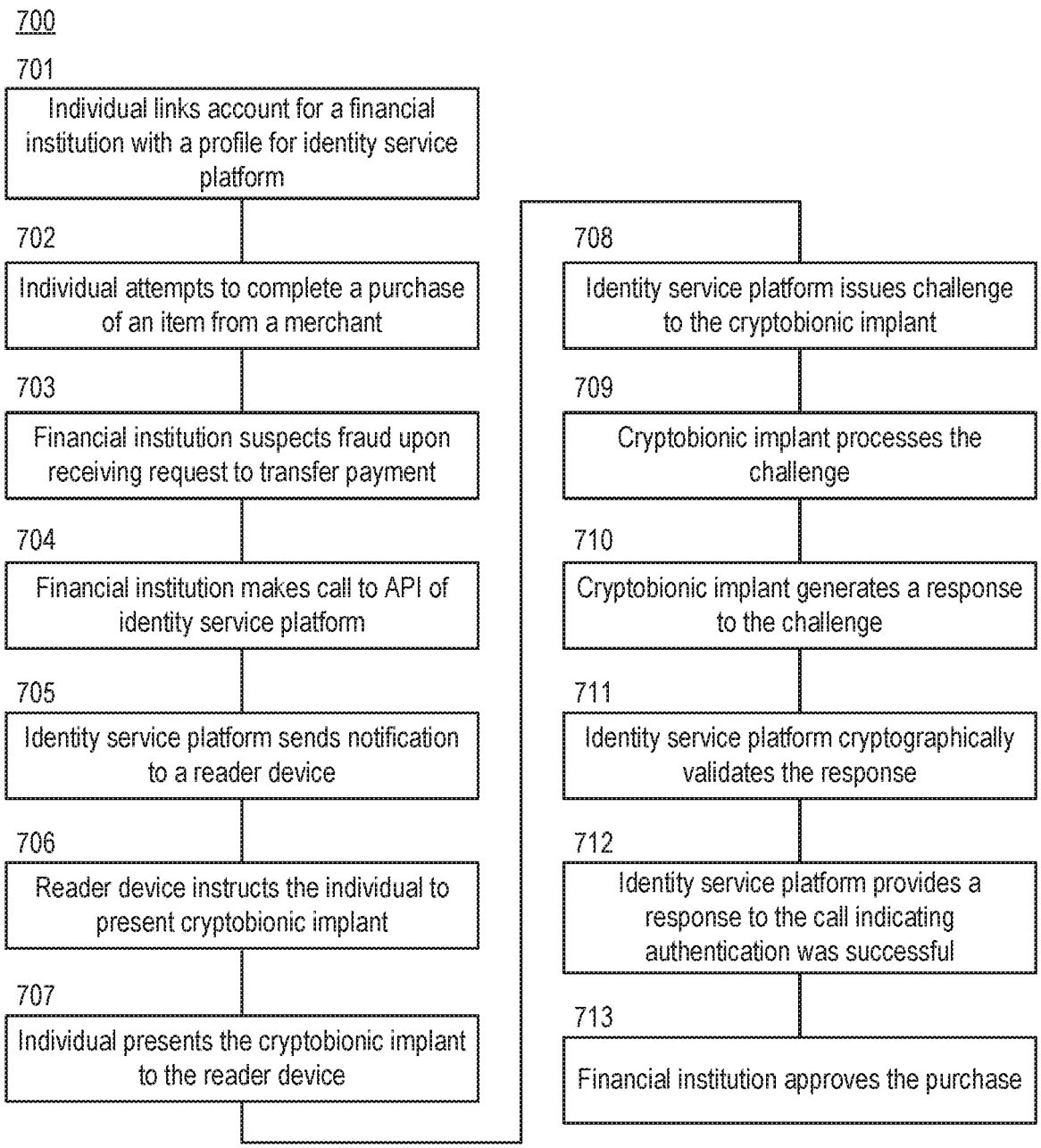
FIG. 7 depicts a flow diagram of a process that details how the technology described herein can be used to complete a payment transaction.

FIG. 7 depicts a flow diagram of a process 700 that details how the technology described herein can be used to complete a payment transaction. Although the process 700 is described in the context of a payment transaction conducted in a digital storefront through a website accessible on an electronic device, those skilled in the art will recognize that the process 700 is equally applicable to payment transactions conducted in physical storefronts. In such a scenario, the individual may be prompted to present his/her cryptobionic implant to the communication interface of a card reader rather than the individual's own electronic device.

Initially, the individual links an account for a financial institution with a profile for an identity service platform (step 701). The individual may link the account and profile through, for example, standard means such as OAuth 2.0, Open ID Connect, or a proprietary authorization protocol. Thereafter, the individual may attempt to complete a purchase of an item through a website associated with a merchant (step 702).

In some instances, the financial institution may suspect fraud upon receiving a request to transfer payment from the individual to the merchant (step 703). The financial institution may suspect fraud if the individual has not purchased any items from the merchant before, if the individual and merchant are located in different countries, if the merchant is on a list of potentially fraudulent merchants, etc. In such embodiments, the financial institution can make a call to an API of the identity service platform (step 704). For example, an electronic device managed by the financial institution, such as a payment processing system or database system, can make a call to a dedicated API accessible only to the financial institution. The call may be representative of an authentication request in which the financial institution provides a token that identifies the linked profile for the identity service platform. The call may also include information regarding the payment transaction, such as the name of the merchant, the location of the merchant, the time, the payment amount, etc. The token may be in a format agreed upon by the financial institution and identity service platform.

The identity service platform can then send a notification to a reader device with information regarding the authentication request (step 705). The notification may specify the name of the merchant, the payment amount, or other relevant data. Upon receiving the notification from the identity service platform, the reader device may instruct the individual to present the cryptobionic implant to the communication interface to validate the authentication request (step 706). As noted above, the reader device may take different forms depending on the type of payment transaction. For example, if the payment transaction is conducted in a digital storefront, then an electronic device associated with the individual may instruct the individual to present the cryptobionic implant for authentication purposes (store 707). The electronic device may be a laptop computer, mobile phone, head-mounted display, or wearable electronic device such as a watch or fitness accessory. If the payment transaction is conducted in a physical storefront, however, then the instructions may be provided by an electronic device associated with the individual, an electronic device associated with the merchant, or some combination thereof. For example, a card reader associated with the merchant may instruct the individual to present the cryptobionic implant to the card reader for authentication purposes. As another example, a mobile phone associated with the individual may instruct the individual to present the cryptobionic implant to the mobile phone for authentication purposes. As another example, the mobile phone associated with the individual may instruct the individual to present the cryptobionic implant to the card reader for authentication purposes.

Steps 708-712 of FIG. 7 may be substantially similar to steps 507-511 of FIG. 5. Accordingly, once the authentication process has been successfully completed by the identity service platform, the financial institution may approve the payment transaction and then transfer payment to the merchant (step 713).

Unless contrary to physical possibility, it is envisioned that the steps described above may be performed in various sequences and combinations. For example, some embodiments of the cryptobionic implant may include active transponders that periodically emit signals in an attempt to establish a connection with the antennas of nearby reader devices. Other embodiments of the cryptobionic implant include passive transponders that only emit signals in response to being scanned by the antenna of a nearby reader device.

Other steps may also be included in some embodiments. For example, the identity service platform may be configured to store data received from a cryptobionic implant in a profile associated with the cryptobionic implant, the individual in whom the cryptobionic implant is implanted, the third-party service requesting authentication of the individual, or any combination thereof.

The technology described herein provides several advantages, such as the easy, secure, and effective transfer of critical data necessary for authorizing identity from vulnerable electronic devices (e.g., mobile phones and laptop computers) into in vivo implants in a frictionless, management-free, and cryptographically-secure manner. For instance, private cryptographic keys can be readily transferred into the more secure, controllable environment offered by in vivo implants. Additionally, the technology can employ procedures that ensure an individual could use any electronic device, even those associated with friends, family members, or strangers, without fear that the electronic device might obtain sensitive information that could be used to represent the individual to another service/system. In effect, the electronic device becomes a simple data pipe that connects the implant to the identity service platform and, by proxy, with any third-party services/systems connected to the identity service platform. A third-party service/system may wish to request cryptographic validation of an authentication, authorization of a transaction, or confirmation of an identity.

In some embodiments, the technology elevates the individual from a simply collection of tokens representative of identity, such as keys, cards, or credentials. The cryptobionic implant, by its very nature, augments the individual with cryptographic capabilities. Together with the identity service platform, the cryptographic implant allows these capabilities to be easily and effectively employed such that the individual can cryptographically represent himself/herself. Accordingly, the focus of identity authorization can return to real people rather than their tokens.

Processing System

Figure 8:
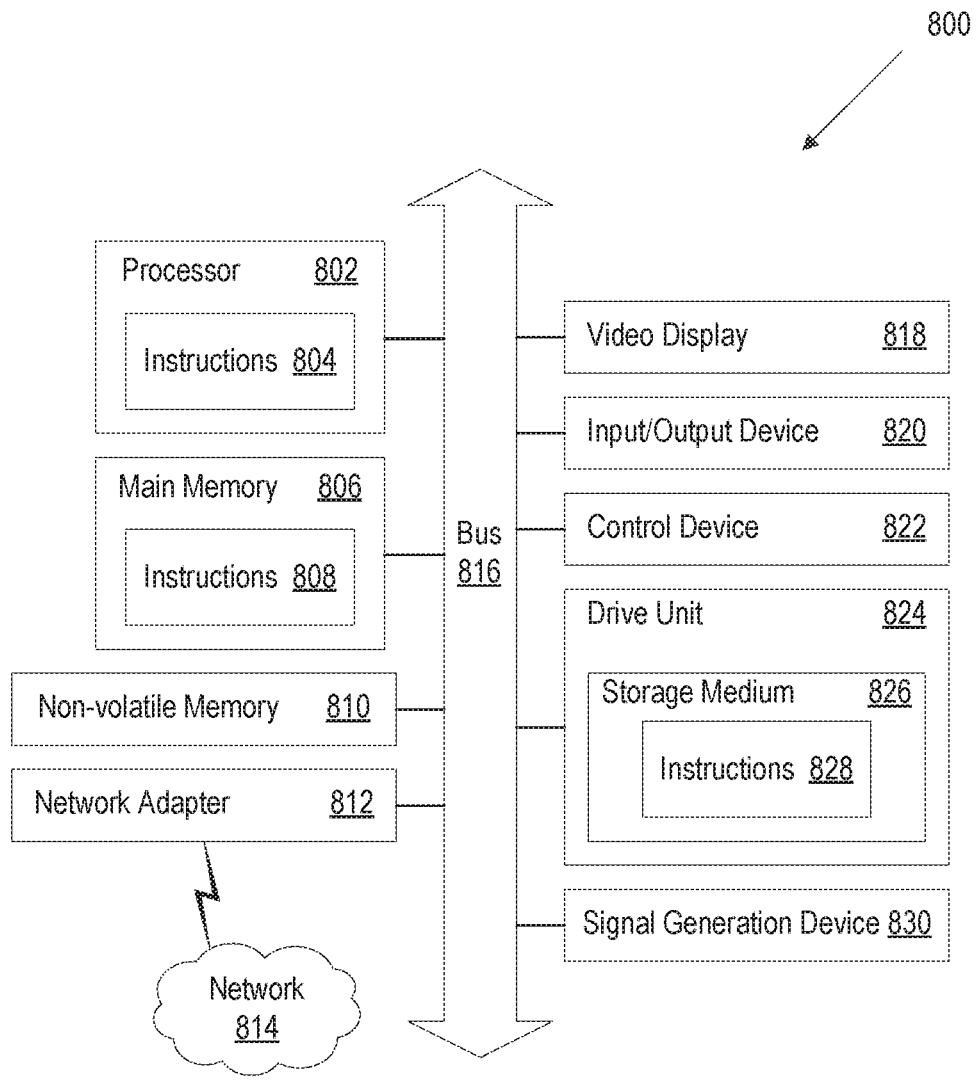
FIG. 8 is a block diagram illustrating an example of a processing system in which at least some operations described herein can be implemented.

FIG. 8 is a block diagram illustrating an example of a processing system 800 in which at least some operations described herein can be implemented. For example, components of the processing system 800 may be hosted on a cryptobionic implant, a reader device that is communicatively coupled to the cryptobionic implant, an electronic device that includes an identity service platform, or distributed therebetween.

The processing system 800 may include one or more central processing units ("processors") 802, main memory 806, non-volatile memory 810, network adapter 812 (e.g., network interface), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 800 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 800.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 828. The term "machine-readable medium" and "storage medium" shall also be taken to include any medium that is capable of storing, encoding, or carrying a set of instructions for execution by the processing system 800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in a computing device. When read and executed by the one or more processors 802, the instruction(s) cause the processing system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 810, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
    receiving, by an identity service platform, a request to authenticate an individual from an external service;
    transmitting, by the identity service platform, an instruction to interrogate an implant located in the individual to a reader device,
        wherein upon receiving the instruction, the reader device instructs the individual to place the implant near the reader device;
    receiving, by the identity service platform, a response to the interrogation of the implant from the reader device;
    determining, by the identity service platform based on the response, that the individual should be authenticated;
    storing, by the identity service platform, the response in a profile associated with the implant, the individual, the external service, or any combination thereof; and
    transmitting, by the identity service platform, a message indicating that the request was completed to the external service.

2. The computer-implemented method of claim 1, further comprising:
    decrypting, by the identity service platform, the response using a cryptographic key associated with the implant, the individual, the external service, or any combination thereof.

3. The computer-implemented method of claim 1, wherein the request is received from the external service through an application programming interface (API).

4. The computer-implemented method of claim 3, wherein the API is a dedicated API accessible only to the external service.

5. The computer-implemented method of claim 3,
    wherein the API is one of multiple APIs through which the identity service platform can receive requests from external services, and
    wherein each API of the multiple APIs is associated with a different external service.

6. The computer-implemented method of claim 1, wherein the instruction to interrogate the implant is transmitted to the reader device across the Internet.

7. The computer-implemented method of claim 1, wherein the response includes a cryptographic key.

8. A method for performing two-factor authentication, the method comprising:
    allowing, by an electronic device, an individual to access a website associated with a service through a web browser;
    receiving, by the electronic device, input from the individual indicative of credentials for the website,
        wherein the credentials are associated with an account for the service;
    receiving, by the electronic device, a request to authenticate the individual from an identity service platform that is communicatively coupled to the service;
    instructing, by the electronic device, the individual to place an implant in proximity of the electronic device;
    transmitting, by the electronic device, a challenge to the implant;
    receiving, by the electronic device, a response to the challenge from the implant, wherein the response includes data encrypted by implant in response to receiving the challenge; and
    providing, by the electronic device, the response to the identity service platform responsible for determining whether to authenticate the individual based on the encrypted data,
        wherein upon receiving the response, the identity service platform stores the response in a profile associated with the implant, the individual, the external service, or any combination thereof.

9. The method of claim 8, wherein said providing comprises:
    transmitting the response to the identity service platform across the Internet.

* * * * *